United States Patent [19]

Webb

[11] Patent Number: 4,500,255
[45] Date of Patent: Feb. 19, 1985

[54] SPACER STRUCTURE

[75] Inventor: George Webb, Cincinnati, Ohio

[73] Assignee: United States of America as represented by the Secretary of the Air Force, Washington, D.C.

[21] Appl. No.: 256,880

[22] Filed: Apr. 24, 1981

[51] Int. Cl.³ .............................................. F01D 1/02
[52] U.S. Cl. .................................. 415/189; 52/309.2; 52/309.8; 415/190; 415/196
[58] Field of Search .............. 415/189, 185, 190, 196, 415/197; 52/309.4, 84, 787, 309.2, 309.8; 416/221, 227

[56] References Cited

U.S. PATENT DOCUMENTS

| 2,331,140 | 10/1943 | Schmidt | 52/378 X |
| 2,633,735 | 4/1953 | Dondero | 52/378 |
| 2,669,383 | 2/1954 | Purvis et al. | 416/221 X |
| 2,898,258 | 8/1959 | Meier et al. | 52/309.2 |
| 2,995,294 | 8/1961 | Warnken | 415/190 X |
| 3,024,968 | 3/1962 | Payne et al. | 415/190 X |
| 3,294,364 | 12/1966 | Stanley | 416/221 X |
| 3,567,337 | 3/1971 | Zerlauth et al. | 416/221 |
| 3,572,970 | 3/1971 | Smuland | 416/221 |
| 3,653,781 | 4/1972 | Cooper | 416/221 |
| 3,725,995 | 4/1973 | Sharp et al. | 52/309.2 X |
| 3,902,824 | 9/1975 | Sauer | 416/215 |
| 3,936,234 | 2/1976 | Tucker et al. | 416/220 R |
| 4,232,496 | 11/1980 | Warkentin | 52/309.2 X |

FOREIGN PATENT DOCUMENTS

| 112346 | 9/1978 | Japan | 415/196 |
| 660383 | 11/1951 | United Kingdom | 415/196 |
| 720802 | 12/1954 | United Kingdom | 416/221 |
| 1341578 | 12/1973 | United Kingdom | 416/221 |
| 1457417 | 12/1976 | United Kingdom | 416/221 |

Primary Examiner—Alfred C. Perham
Attorney, Agent, or Firm—Donald J. Singer; Jacob N. Erlich

[57] ABSTRACT

A structure useable as a spacer. In a preferred embodiment, the spacer is ideally suited (as one of a plurality of identical spacers) for use as a spacer between every two adjacent stator vanes of a stator vane ring of a multiple-stage fan of a gas turbofan engine. The spacer is in the form of a rectangular solid and comprises a metal face skin member having a curved aerodynamically configurated outer surface with a centrally-located longitudinally-positioned concavity which functions as a rib, and a backing pad member that is made of a molded polyethelene material with integral peripheral edge lip seals that are coated with a polyurethane material, and that is joined by its outer surface to the inner surface of the face skin member, with the backing pad member having an embedded rib skin stiffener positioned under, along, and in contact with the concavity in the face skin member. In the adaptation as a fan stator vane spacer, each spacer is releasably attached by novel means to the fan stator vane ring in the space on the ring between every two adjacent fan stator vanes, and is positioned in the fore-to-aft fan air flow such that the fan air flows over the curved aerodynamically configurated outer surface of the face skin member in the direction of the longitudinally-positioned concavity. In this adaptation, the spacer provides peripheral sealing, ice impact resistance, and face skin stability, and prevents or at least minimizes fan air flow "short circuits" around vane ends and beneath the spacer.

16 Claims, 5 Drawing Figures

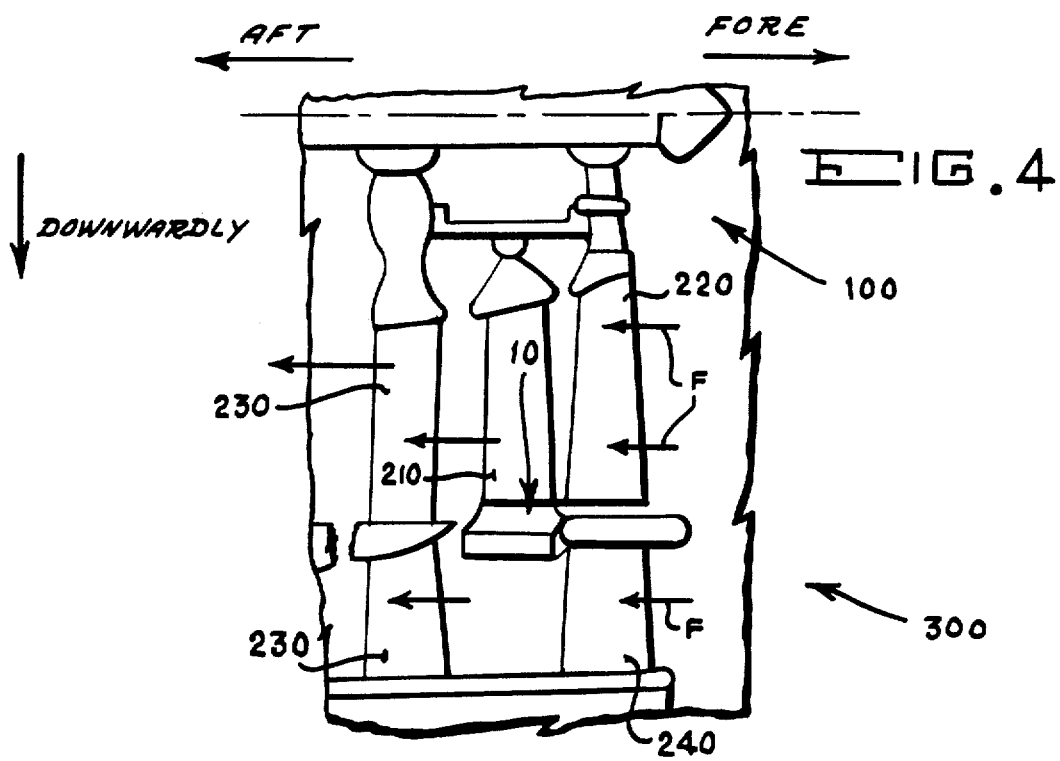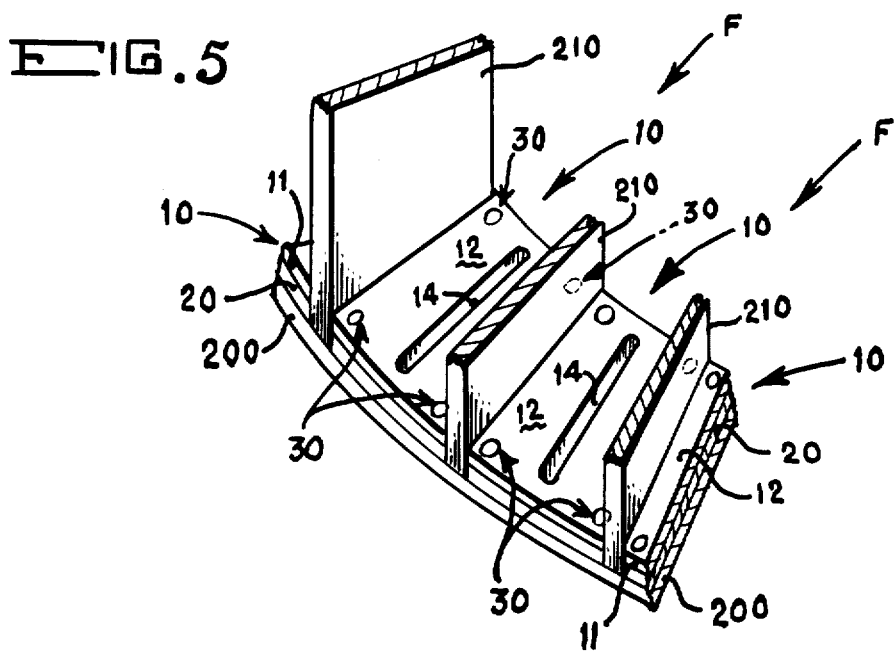

SPACER STRUCTURE

STATEMENT OF GOVERNMENT INTEREST

The invention described herein may be manufactured and used by or for the Government for governmental purposes without the payment of any royalty thereon.

BACKGROUND OF THE INVENTION

This invention relates to a unique structure useable as a spacer and, more particularly, to a spacer structure that is ideally suited for use as a fan stator vane spacer in a gas turbofan engine.

In gas turbofan engines that are commonly used both on civil and military aircraft, the necessary removal of each spacer between every two adjacent stator vanes of the multiple-stage fan results in approximately a seventy percent scrappage of the spacers at overhaul. This is because the present method of assembly is to fair all edges of the spacer using either a "Churchill" or a "JA106A" (or "JA106B") fairing compound to reduce "short circuits" (i.e., deviations) of the fore-to-aft fan air flow around the vane ends and beneath the spacers. Some of these fan stator vane spacers, including those referred to as "mid inner" spacers, are bonded to the fan stator vane ring, which said bonding adds to the difficulty in removing these spacers and adds to the scrappage problem. In addition, these "mid inner" spacers are subject to rotor blade ice impact damage.

I have invented a structure that is generally useable as a spacer; that is also adaptable for use as a mid inner spacer for fan stator vanes; that is releasably attachable to a fan stator vane ring, rather than bondable thereto; that greatly reduces scrapage at overhaul; that eliminates or at least substantially reduces fan air flow "short circuits"; that resists ice impact damage; and, that accomplishes all of the foregoing at a cost less than, or not higher than, the present cost of spacers and their replacement. Thereby, I have significantly advanced the state-of-the-art.

SUMMARY OF THE INVENTION

The invention is a unique structure that is generally useable as a spacer, and that in a particular application is useable as spacer between adjacent stator vanes on a fan stator of a multiple-stage fan of a gas turbofan engine.

Accordingly, the principal object of this invention is to provide the above said spacer by way of teaching the structure of a preferred embodiment thereof.

This principal object, as well as other related objects (such as simplicity, low cost, and reliability), of this invention will become readily apparent after a consideration of the description of the invention, together with reference to the contents of the Figures of the drawing.

DESCRIPTION OF THE DRAWING

FIG. 4 is a side elevation view, in simplified schematic form and partially fragmented, of the lower portion of a typical multiple-stage fan of a gas turbofan engine, showing a representative one of my inventive spacer structures in its location in the working environment; and FIG. 5 is a prespective view in simplified pictorial and schematic form and partially fragmented, of a representative plurality of my inventive spacers releasably attached to a fan stator vane ring, between representative adjacent fan stator vanes, in the lower portion of a typical multiple-stage fan of a gas turbofan engine.

DESCRIPTION OF THE PREFERRED EMBODIMENT

Figure 1:
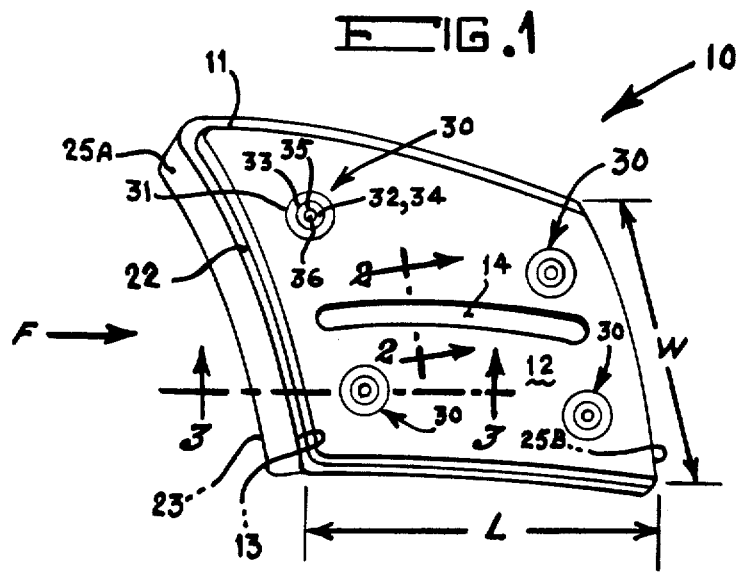
FIG. 1 is a perspective view in simplified pictorial and schematic form, of a preferred embodiment of the inventive spacer structure.

With reference to FIGS. 1-5, inclusive, therein is shown in diverse views the preferred embodiment 10 of my inventive structure which is useable as a spacer (hereinafter sometimes referred to as "spacer structure" or "spacer").

In its basic and generic structural form, the spacer structure 10 comprises: a metal face skin member 11 having an inner surface 13 and a peripheral edge surface 13A, an aerodynamically configurated outer surface 12 with a centrally positioned concavity 14 therein which constitutes and functions as a rib, and a preselected geometric form with a width W, with the concavity 14 longitudinally-positioned i.e., aligned with the fore-to-aft fan air flow "F"; and, a backing pad member 20 made of a thermoplastic foamed unicellular material 21, and, with this member 20 having an outer surface 22, a preselected geometric form similar to and larger than the preselected geometric form of the face skin member 11, an embedded rib skin stiffener 24 positioned under, along, and in contact with the concavity 14 in the outer surface 12 of the face skin member 11, and integral peripheral edge sealing lips (such as representative ones 25A and 25B), and with this member 20 oriented with the face skin member 11, and joined by its own outer surface 22 to the inner surface 13 and to the peripheral edge surface 13A of the face skin member 11.

Figure 2:
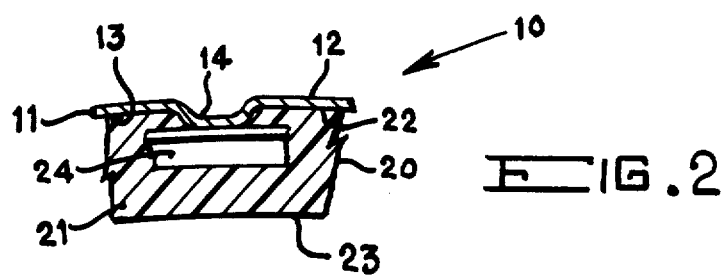
FIG. 2 is the view of that portion of the preferred embodiment that is seen along line 2—2 of FIG. 1, in simplified pictorial and schematic form, partially in cross section, and partially fragmented.

As a matter of preference and not of limitation, the face skin member 11 is of aluminum; the backing pad member 20 is made of a molded polyethelene material 21; the integral peripheral edge sealing lips, such as representative ones 25A and 25B, are coated with a polyurethane material 26; the face skin member 11 has a length L and a width W, and the preselected geometric form of this member 11 is essentially that of a rectangular solid having a curvature along the width W (as best seen in FIGS. 1 and 2) which is similar in shape (i.e., in curvature) to a portion of a ring; and, the preselected geometric form of the backing pad member is essentially that of a rectangular solid having a curvature which is complementary to the curvature of the face skin member 11. It is here to be noted that the face skin, member 11 can, if desired or necessary, be curved also along its length L, as is shown in FIG. 1.

Figure 3:
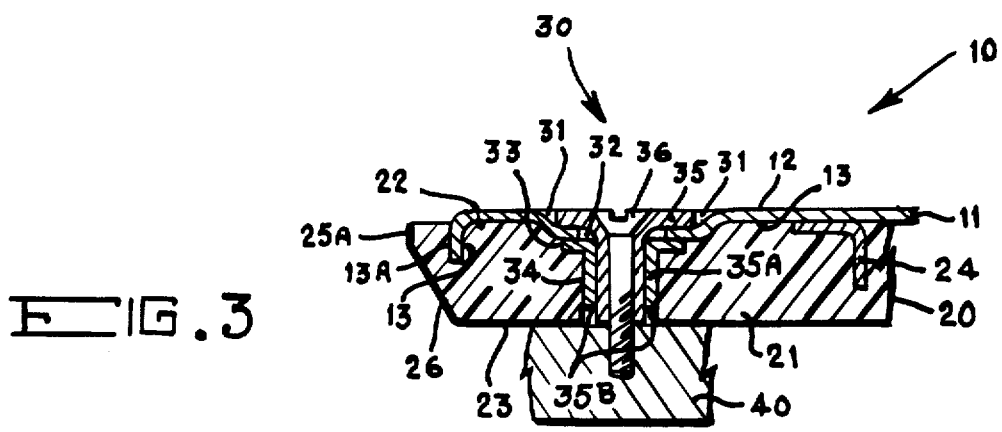
FIG. 3 is the view of that portion of the preferred embodiment that is seen along line 3—3 of FIG. 1, in simplified pictorial and schematic form, partially in cross section, and partially fragmented.

If one wants or needs to releasably attach the spacer structure 10 to a body, such as body 40, FIG. 3, then the spacer structure 10 further comprises means (generally designated 30, FIGS. 1 and 3) for releasably attaching the face skin member 11, and the backing pad member 20 which is joined to the face skin member 11, to that body 40. Then, in that event, the releasable attaching means 30 of the spacer structure preferably includes: a first plurality of a preselected member of depressions (such as are similarly designated 31, FIGS. 1 and 3) in the outer surface 12 of the face skin member 11, with each depression having an opening 32 extending from the outer surface 12 of the face skin member 11 through to the inner surface 13 of the face skin member 11; a second plurality of a preselected number of depressions (such as are similarly designated 33, FIGS. 1 and 3) in the outer surface 22 of the backing pad member 20, with one depression 33 of this plurality for each depression 31 of the first plurality, and with these depressions 33 of the second plurality being complementary in shape to and being aligned with the depressions 31 of the first plurality, and also with these depressions 33 of the second plurality each having an opening 34 extending from the outer surface 22 of the backing pad member 20 through to the inner surface 23 of this member 20, with these openings 34 in the backing pad member 20 being in alignment with the openings 32 in the face skin member 11 and, therefore, a plurality of sets of aligned openings (32, 34) resulting; and two pluralities of bushings (such as are similarly designated 35 and 35A, FIGS. 1 and 3), with two bushings 35 and 35A for each set of the plurality of sets of aligned openings (i.e., 32 and 34), and with each set of two bushings 35 and 35A disposed in its respective set of aligned openings; and, a plurality of fasteners, preferably screws (such as are similarly designated 36, FIGS. 1 and 3), with one screw 36 for each two bushings 35 and 35A, and with each screw 36 disposed in and extending through its two respective bushings 35 and 35A and screwed into the body 40, FIG. 3, with the result that the spacer structure 10 is thereby releasably attached to the body 40.

It is to be noted that bushing 35 inserts thru opening 32 and then the bushing 35A is forced over bushing 35 to sandwich face skin member 11, forming a supportive mechanical joint. This joint is also bonded by adding adhesive to the mating surface in advance of the joining of the two bushings 35 and 35A. The bushing are sized to assure a slight interference fit on the internal diameter of bushing 35A with the outside diameter of bushing 35.

Additionally, the thickness of the pad 20 is selected so that surface 23 of the pad 20 protrudes beyond the end surface 35B of the bushing 35A to affect a slight compression of the pad when spacer 10 is secured, preventing/eliminating pockets in which fluids could be stored.

It is here to be noted that: the first plurality of a preselected number of depressions 31 in the outer surface 12 of the face skin member 11 comprises four (4) such depressions; that the second plurality of a preselected number of depressions 33 in the outer surface 22 of the backing pad member 20 also comprises four (4) such depressions; that the plurality of sets of aligned openings 32 and 34 in and through the face skin member 11 and the backing pad member 20 also comprises four (4) such sets; that each plurality of bushings 35 and 35A also comprises four (4) such bushings in each plurality; and, that the plurality of screws 36 also comprises four (4) such screws.

It is also to be noted that, as a matter of preference, face skin member 11 and the backing pad member 20 are joined by bonding. That bonding may be accomplished by any known conventional means or method, such as with the use of an epoxy adhesive, or by what is referred to in the art as "heat melting" of the backing pad member 20, or the like. The "heat melting" approach is preferred.

With reference to FIGS. 4 and 5 and as previously stated, it is to be remembered that my spacer structure 10 or, more accurately, a plurality of my spacer structures 10 that are identical, is ideally suited for use as spacer(s) in combination with a fan stator vane ring 200, FIGS. 4 and 5, of a gas turbofan engine 300, FIG. 4, having a multiple-stage fan 100, FIG. 4, located forward of the fan stator vane ring 200, with the engine 300 having a fore-to-aft fan air flow "F", FIGS. 1, 4 and 5, and with the fan stator vane ring 200, FIGS. 4 and 5, having a plurality of circumferentially disposed adjacent fan stator vanes (such as are similarly designated 210, FIGS. 4 and 5) connected to the stator ring 200 with an equal space between each two adjacent stator vanes 210 (as can best be seen in FIG. 5), and also with a different one of the plurality of my identical spacers 10 disposed in and removably attached to the space between each two adjacent vanes 210.

It is to be remembered that, as shown in FIG. 4, the fan 100 is a typical multiple-stage one. More definitely, the fan has a plurality of smaller forwardly disposed fan (rotor) vanes, such as representative one 220, another plurality of larger fan (rotor) vanes, such as representative one 230, disposed aft, a volume therebetween in which the fan stator vane ring 200 and the plurality of stator vanes 210 connected thereto is also disposed, and a plurality of other stator vanes, such as representative one 240, that are disposed forward of the stator vanes 210 and circumferentially around the forwardly disposed fan (rotor) vanes 220. My spacers 10 are used on the ring 200 between the stator vanes 210; and my spacers are sometimes referred to in the art as "mid inner" spacers because they are in the middle and are on the inside of the ring 200.

Because each spacer 10 of the plurality shown in FIGS. 4 and 5 is identical, and because the preferred embodiment of each spacer 10 already has been described and shown in FIGS. 1-3, inclusive, it is not deemed necessary to describe the structure of the spacer 10 again hereat.

MANNER OF USE OF THE INVENTION

The manner of use of the preferred embodiment of the inventive spacer structure 10, FIGS. 1-5, inclusive, per se, and also in its adaptation for use in combination with the fan stator vane ring 200 of the gas turbofan engine 300 as a spacer between each two adjacent stator vanes 210 that are connected to the ring 200, can be easily ascertained by any person of ordinary skill in the art from the foregoing description, coupled with reference to the contents of the Figures of the drawing.

For others, the following simplified explanation is given:

Assuming that a plurality of my spacer structures 10 are to used in combination with the fan stator vane ring 200 with one spacer 10 to be positioned and releasably attached to each space between every two adjacent stator vanes 210, then each spacer 10 is so positioned and so attached with the use of the screws 36, with the inner surface 23 of the backing pad member 20 down and abutting the surface of the fan stator vane ring 200, and with the outer surface 12 of face skin member 11 up and in the flow of the fore-to-aft fan air F, and also with the concavity 14 in the outer surface 12 of the face skin member 20 in a position parallel to the flow F.

It is to be noted that this positioning is without the fairing of the edges of the spacer 10 with fairing compound, unlike as is necessarily done with prior art spacers.

As a result, any spacer 10 may be removed at overhaul without the danger of being scrapped because it had to be forcibly urged and removed from the ring 210.

CONCLUSION

It is abundantly clear from all of the foregoing, and from the contents of the Figures of the drawing, that the stated principal object of my invention 10, as well as other related objects of the invention 10 (such as simplicity, reliability, and low cost), have been achieved.

It is to be noted that, although there have been described and shown the fundamental and unique features of my invention 10 as applied to a preferred embodiment and to a particular adaptation, various other embodiments, adaptations, variations, and substitutions, additions, omissions, and the like may occur to, and can be made by, those or ordinary skill in the art, without departing from the spirit of my invention 10.

What is claimed is:

1. A structure useable as a spacer, comprising:
   a. a metal face skin member having an inner surface, and aerodynamically configurated outer surface with a centrally positioned concavity therein, and a preselected geometric form with a width, wherein said concavity is positioned transverse to said width, and whereby said concavity constitutes and functions as a rib;
   b. and, a backing pad member made of a thermoplastic foamed unicellular material, wherein this member has an outer surface, a preselected geometric form similar to and larger than said preselected geometric form of said face skin member, an embedded rib skin stiffener positioned under, along, and in contact with said concavity in said outer surface of said face skin member, and integral peripheral edge sealing lips, wherein said backing pad member is oriented with said face skin member and is joined by its own outer surface to said inner surface of said face skin member.

2. A structure, as set forth in claim 1, wherein:
   a. such face skin member is made of aluminum;
   b. said backing pad member is made of molded polyethelene material;
   c. said integral peripheral edge sealing lips of said backing pad member are coated with polyurethane;
   d. said face skin member has a length, and said preselected geometric form of such face skin member is essentially that of a rectangular solid having a curvature along said width which is similar in shape to a portion of a ring;
   e. and, said preselected geometric form of said backing pad member is essentially that of a rectangular solid having a curvature which is complementary to said curvature of said face skin member.

3. A structure, as set forth in claim 2, wherein said structure is to be releasably attached to a body, and wherein said structure further comprises means for releasably attaching said face skin member, and said backing pad member which is joined to said face skin member, to said body.

4. A structure, as set forth in claim 3, wherein said means for releasably attaching said joined face skin and backing pad members to said body includes:
   a. a first plurality of a preselected number of depressions in said outer surface of each face skin member, with each depression of this plurality having an opening extending from said outer surface of said face skin member through to said inner surface of this member;
   b. a second plurality of a preselected number of depressions in said outer surface of said backing pad member, with one depression of this plurality for each depression of said first plurality, and with these depressions of said second plurality complementary in shape to and aligned with the depressions of said first plurality, and also with these depressions of the second plurality each having an opening extending from said outer surface of said backing pad member through to said inner surface of this member, wherein these openings in said backing pad member are in alignment with said openings in said face skin member, whereby a plurality of sets of aligned openings results;
   c. a first plurality of bushings, with one bushing for each set of said plurality of sets of aligned openings, and with each bushing disposed in its respective set of aligned openings;
   d. a second plurality of bushings, with one bushing for each set of plurality of sets of aligned openings, and with each bushing disposed in its respective set of aligned openings and also is disposed such as to surround a corresponding bushing of said first plurality of bushings;
   e. and, a plurality of screws, with one screw for each two corresponding bushings of said two pluralities of bushings, and with each screw disposed in and extending through its respective bushings and screwed into said body, whereby said structure is thereby releasably attached to said body.

5. A structure, as set forth in claim 4, wherein
   a. said first plurity of a preselected number of depressions in said outer surface of said face skin member comprises four such depressions;
   b. said second plurality of a preselected number of depressions in said outer surface of said backing pad member comprises four such depressions;
   c. said plurality of sets of aligned openings in and through said face skin member and said backing pad member comprises four such sets;
   d. said first plurality of bushings comprises four such bushings;
   e. said second plurality of bushings comprises four such bushings;
   f. and, said plurality of screws comprises four such screws.

6. A structure, as set forth in claim 5, wherein said face skin member and said backing pad member are joined by bonding.

7. A structure, as set forth in claim 6, wherein said bonding of said face skin member to said backing pad member is with an epoxy adhesive.

8. A structure, as set forth in claim 6, wherein said bonding of said face skin member to said backing pad member is by heat melting said backing pad member.

9. A structure, as set forth in claim 6, wherein said face skin member also has a length, and said preselected geometric form of said face skin member is such that said member also has a curvature along said length which is similar in shape to a portion of a ring.

10. A plurality of identical structures used as spacers in combination with a fan stator vane ring of a gas turbofan engine having a fan located forward of said fan stator vane ring, with said engine having a fore-to-aft fan air flow, and with said fan stator vane ring having a plurality of circumferentially disposed adjacent fan stator vanes connected to said ring with an equal space between each two adjacent vanes, and also with a different one of said plurality of identical spacer structures disposed in and removably attached to the space between each two adjacent corresponding vanes;

wherein each spacer structure of said plurality of identical spacer structures comprises:

a. a metal face skin member having an inner surface, an aerodynamically configured outer surface with a centrally positioned concavity therein, and a shape complementary to and sized to fit said space on said fan stator vane ring, between said two respective corresponding adjacent fan stator vanes of said spacer structure;

b. a backing pad member made of a thermoplastic foamed unicellular material with an embedded rib stiffener positioned under, along, and in contact with said concavity in said outer surface of said face skin member, and having an outer surface and a shape similar to and larger than said face skin member, and also having edge sealing lips integral thereto, with this member joined by its outer surface to said inner surface of each face skin member in a position such that the respective shapes of this member and of said face skin member are oriented, thereby said edge sealing lips of this member extend beyond said face skin member;

c. and means, associated with said face skin member and said joined backing pad member, for removably attaching this spacer structure to said fan stator vane ring in said space between said respective corresponding two adjacent fan stator vanes;

and, wherein each spacer structure of said plurality of identical spacer structures is also disposed such that said face skin member has its aerodynamically configurated outer surface exposed to, and said concavity therein positioned in alignment with, said for-to-aft fan air flow, thereby said fan air flows on and over said aerodynamically configurated outer face skin member, and said concavity in said face skin member, smoothly, without turbulence, and without deviation.

11. A plurality of identical spacer structures, as set forth in claim 10, wherein:

a. said face skin member is made of aluminum;

b. said backing pad member is made of a molded polyethelene material and is bonded to each face skin member;

c. said peripheral edge lip sealings of said backing pad members are coated with a polyurethane material;

d. said face skin member has a width, and said shape of said face skin member is essentially that of a rectangular solid which is curved along said width so as to be complementary to said fan stator vane ring;

e. and, said shape of said backing pad member is essentially that of a rectangular solid having a curved outer surface which is complementary to said inner surface of said skin member, and also having a curved inner surface which is complimentary to said fan stator vane ring.

12. A structure, as set forth in claim 11, wherein said means for releasably attaching said joined face skin and backing pad members to said body includes:

a. a first plurality of a preselected number of depressions in said outer surface of each face skin member, with each depression of the plurality having an opening extending from said outer surface of said face skin member through to said inner surface of this member;

b. a second plurality of a preselected number of depressions in said outer surface of said backing pad member, with one depression of this plurality for each depression of said first plurality, and with these depressions of said second plurality complementary in shape to and aligned with the depressions of said first plurality, and also with those depressions of the second plurality each having an opening extending from said outer surface of said backing pad member through to said inner surface of this member, wherein these openings are in alignment with said openings in said face skin member, whereby a plurality of sets of aligned openings results;

c. a first plurality of bushings, with one bushing for each set of each plurality of sets of aligned openings, and with each bushing disposed in its respective set of aligned openings;

d. a second plurality of bushings, with one bushing for each set of plurality of sets of aligned openings, and with each bushing disposed in its respective set of aligned openings and also is disposed such as to surround a corresponding bushing of said first plurality of bushings;

e. and, a plurality of screws, with one screw for each bushing of said plurality of bushings, with each screw disposed in and extending through its respective bushing and screwed into said body, whereby said structure is thereby releasably attached to said body.

13. A structure, as set forth in claim 12, wherein:

a. said first plurality of a preselected number of depressions in said outer surface of said face skin member comprises four such depressions;

b. said second plurality of a preselected number of depressions in said outer surface of said backing pad member comprises four such depressions;

c. said plurality of sets of aligned openings in and through said face skin member and said backing pad member comprises four such sets;

d. said first plurality of bushings comprises four such bushings;

e. said second plurality of bushings comprises four such bushings;

f. and, said plurality of screws comprises four such screws.

14. A spacer structure, as set forth in claim 13, wherein said face skin member and said backing pad member are bonded with an epoxy.

15. A spacer structure, as set forth in claim 13, wherein said face skin member and said backing pad member are bonded by hot melting said backing pad member.

16. A spacer structure, as set forth in claim 13, wherein said face skin member also has a length, and said shape of said face skin member is essentially that of a rectangular solid which is also curved along said length so as to be complementary to said fan stator vane ring.

* * * * *